(12) United States Patent
Eom

(10) Patent No.: US 8,530,095 B2
(45) Date of Patent: Sep. 10, 2013

(54) NEGATIVE ACTIVE MATERIAL FOR RECHARGEABLE LITHIUM BATTERY, METHOD OF PREPARING SAME, AND RECHARGEABLE LITHIUM BATTERY INCLUDING SAME

(75) Inventor: Ji-Yong Eom, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 357 days.

(21) Appl. No.: 12/877,893

(22) Filed: Sep. 8, 2010

(65) Prior Publication Data
US 2011/0059366 A1 Mar. 10, 2011

Related U.S. Application Data

(60) Provisional application No. 61/240,809, filed on Sep. 9, 2009.

(51) Int. Cl.
*H01M 4/58* (2010.01)

(52) U.S. Cl.
USPC ............... 429/231.95; 429/231.1; 429/231.6; 429/231.5; 429/231.3; 429/231.2; 252/182.1; 423/598

(58) Field of Classification Search
USPC ............ 429/231.95, 231.1, 231.6, 231.5, 429/231.3, 231.2; 252/182.1; 423/598
See application file for complete search history.

(56) References Cited

U.S. PATENT DOCUMENTS

| | | | |
|---|---|---|---|
| 6,372,384 B1 | 4/2002 | Fujimoto et al. | |
| 6,827,921 B1 | 12/2004 | Singhal et al. | |
| 8,318,351 B2 | 11/2012 | Inagaki et al. | |

FOREIGN PATENT DOCUMENTS

| | | |
|---|---|---|
| JP | 2000-106187 | 4/2000 |
| JP | 2000-277116 | 10/2000 |
| JP | 2001-240498 | 9/2001 |
| JP | 2003-238156 | 8/2003 |
| JP | 2009-032704 | 2/2009 |
| KR | 10-2007-0066861 | 6/2007 |
| KR | 10-2008-0023831 | 3/2008 |
| KR | 10-2008-0077412 | 8/2008 |

OTHER PUBLICATIONS

Japanese Office action dated Oct. 16, 2012, for corresponding Japanese Patent application 2010-201900, (3 pages).
Patent Abstracts of Japan, and English machine translation of Japanese Publication 2000-106187, (9 pages).
Patent Abstracts of Japan, and English machine translation of Japanese Publication 2003-238156, (8 pages).
J.L. Allen, T.R. Jow, J. Wolfenstine, Low temperature performance of nanophase $Li_4Ti_5O_{12}$, Journal of Power Sources, Jan. 25, 2006, pp. 1340-1345, vol. 159.
Jianqiu Deng, Zhouguang Lu, I. Belharouak, K. Amine, C.Y. Chung: Preparation and electrochemical properties of $Li_4Ti_5O_{12}$, Journal of Power Sources, Apr. 18, 2009, pp. 816-821, vol. 193.
Cheng-Min Shen, Xiao-Gang Zhang, Ying-Ke Zhou, Hu-Lin Li, Preparation and characterization of nanocrystalline $Li_4Ti_5O_{12}$ by sol-gel method, Materials Chemistry and Physics, 2002, pp. 437-441, XP002607172, vol. 78.
M. Ganesan, $Li_4Ti_{2.5}Cr_{2.5}O_{12}$ as anode material for lithium battery, Ionics, Oct. 24, 2007, pp. 395-401, vol. 14, India.
Extended European Search Report, dated Dec. 10, 2010, issue in EP Application No. 10175921.5, 7 pages.
SIPO Office action dated Feb. 5, 2013 for corresponding CN application No. 201010278417.6, with English translation (14 pages).

*Primary Examiner* — Laura Weiner

(74) *Attorney, Agent, or Firm* — Christie, Parker & Hale, LLP

(57) ABSTRACT

Embodiments of the present invention are directed to negative active materials for rechargeable lithium batteries including lithium titanium oxides. The lithium titanium oxide has a full width at half maximum (FWHM) of 2θ of about 0.08054° to about 0.10067° at a (111) plane (main peak, 2θ=18.330°) as measured by XRD using a Cu Kα ray.

8 Claims, 1 Drawing Sheet

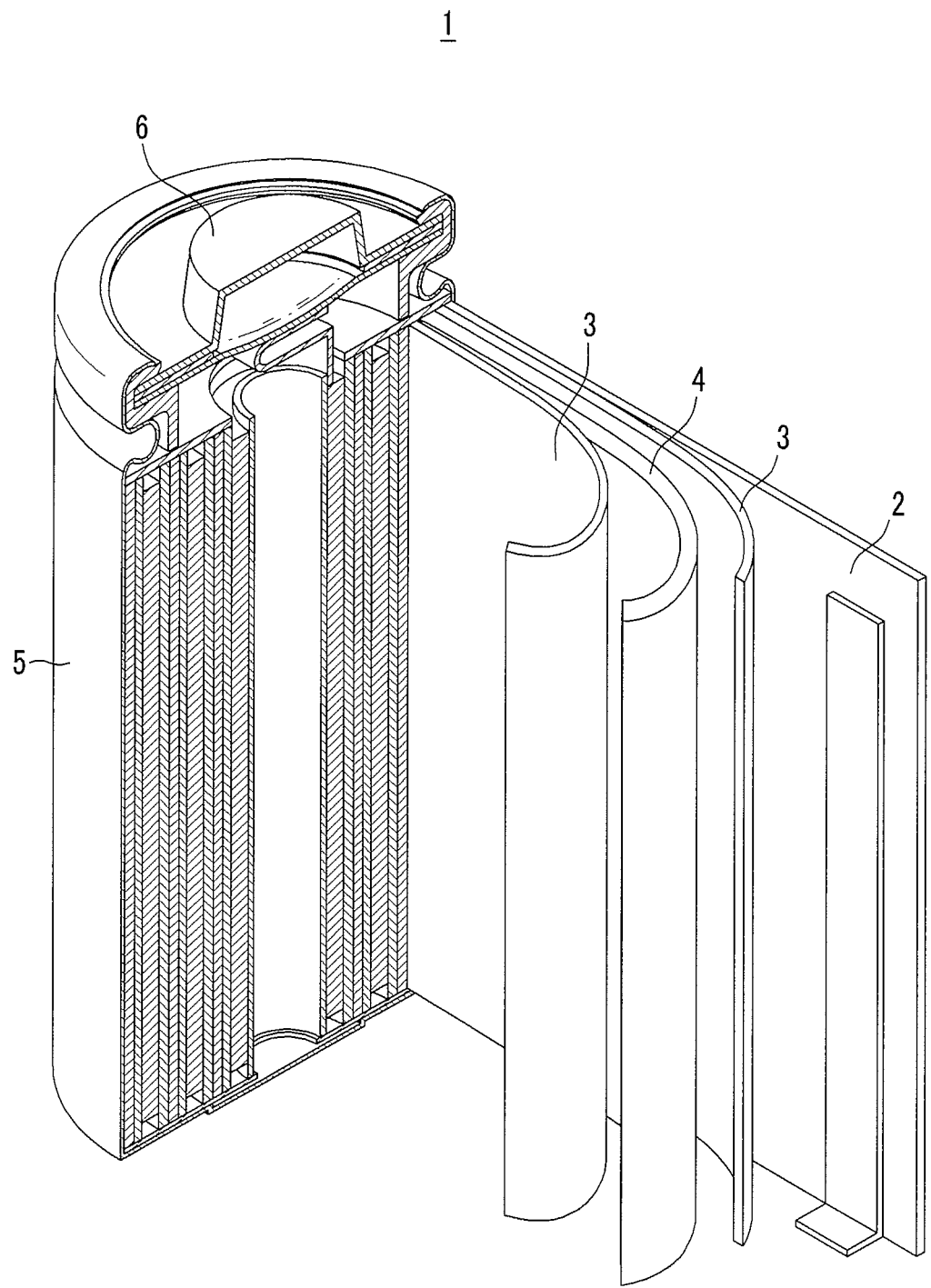

NEGATIVE ACTIVE MATERIAL FOR RECHARGEABLE LITHIUM BATTERY, METHOD OF PREPARING SAME, AND RECHARGEABLE LITHIUM BATTERY INCLUDING SAME

CROSS-REFERENCE TO RELATED APPLICATIONS

This application claims priority to and the benefit of Provisional Patent Application No. 61/240,809 filed in the U.S. Patent and Trademark Office on Sep. 9, 2009, the entire contents of which are incorporated herein by reference.

BACKGROUND OF THE INVENTION

1. Field of the Invention

This disclosure relates to negative active materials for rechargeable lithium batteries, methods of preparing the same, and rechargeable lithium batteries including the same.

2. Description of the Related Art

Rechargeable lithium batteries have recently drawn attention as power sources for small, portable electronic devices. They use organic electrolyte solutions and therefore have twice the discharge voltage of conventional batteries using alkaline aqueous solutions. Accordingly, they have high energy density.

For the positive active material of a rechargeable lithium battery, chalcogenide compounds (i.e., composite metal oxides such as $LiCoO_2$, $LiMn_2O_4$, $LiNi_{1-x}Co_xO_2$ (0<x<1)), and the like have been used.

For the negative active material of a rechargeable lithium battery, various carbon-based materials capable of intercalating and deintercalating lithium ions have been used, for example, artificial graphite, natural graphite, and hard carbon. Graphite increases discharge voltage and energy density of the battery because it has a low discharge potential of −0.2V (compared to lithium). A battery using graphite as the negative active material has a high average discharge potential of 3.6V and good energy density. Furthermore, among the aforementioned carbon-based materials, graphite is used most often since graphite yields better battery cycle life due to its good reversibility. However, graphite active materials have low density (i.e., a theoretical density of 2.2 g/cc) and therefore yield low capacity in terms of energy density per unit volume when used as the negative active material. Further, graphite causes swelling or capacity reduction when the battery is misused or overcharged and the like, because graphite is likely to react with the organic electrolyte at high discharge voltages.

SUMMARY OF THE INVENTION

According to embodiments of the present invention, a negative active material for a rechargeable lithium battery has improved high rate charging characteristics, cycle-life characteristics, and safety characteristics.

Other embodiments of the present invention are directed to methods of preparing the negative active material.

According to still other embodiments of present invention, rechargeable lithium batteries include the negative active materials.

According to embodiments of the present invention, a negative active material for a rechargeable lithium battery includes a lithium titanium oxide. The lithium titanium oxide has a full width at half maximum (FWHM) of 2θ ranging from about 0.08054° to about 0.10067° at a (111) plane (main peak, 2θ=18.330° as measured by X-ray diffraction (XRD) using a Cu Kα ray. For example, in some embodiments, the lithium titanium oxide may have a FWHM of 2θ ranging from about 0.08477° to about 0.09475° at the (111) plane (main peak, 2θ=18.330° as measured by X-ray diffraction using a Cu Kα-ray.

In some embodiments, the lithium titanium oxide may be represented by the following Chemical Formula 1.

$$Li_{4-x-y}M_yTi_{5+x-z}M'_zO_{12}$$  Chemical Formula 1

In the above Chemical Formula 1, x ranges from 0 to 1, y ranges from 0 to 1, and z ranges from 0 to 1. Also, M may be selected from La, Tb, Gd, Ce, Pr, Nd, Sm, Ba, Sr, Ca, Mg, and combinations thereof. M' may be selected from V, Cr, Nb, Fe, Ni, Co, Mn, W, Al, Ga, Cu, Mo, P, and combinations thereof.

In some exemplary embodiments, the lithium titanium oxide may be represented by the following Chemical Formula 2.

$$Li_{4-x}Ti_{5+x}O_{12}$$  Chemical Formula 2

In the above Chemical Formula 2, x ranges from 0 to 1.

One nonlimiting example of a lithium titanium oxide is $Li_4Ti_5O_{12}$.

The lithium titanium oxide may have a crystal size ranging from about 800 Å to about 1000 Å. According to some embodiments, the lithium titanium oxide may have a crystal size ranging from about 850 Å to about 950 Å.

According to other embodiments of the present invention, a method of preparing a negative active material for a rechargeable lithium battery includes heating a lithium titanium oxide precursor at about 800° C. to about 850° C. under an inert atmosphere to provide a lithium titanium oxide. The heat treatment may be carried out under an inert atmosphere selected from nitrogen, argon, and combinations thereof.

In some embodiments, the lithium titanium oxide may be prepared by heating a lithium titanium oxide precursor at about 810° C. to about 840° C. under an inert atmosphere.

The heat treatment process may be carried out by heating the lithium titanium oxide precursor for about 5 to about 10 hours under an inert atmosphere.

According to further embodiments of the present invention, a rechargeable lithium battery includes a negative electrode including the negative active material, a positive electrode including a positive active material, and a non-aqueous electrolyte.

The negative active material for a rechargeable lithium battery according to embodiments of the present invention exhibit good high-rate charge characteristics, cycle-life characteristics, and stability.

BRIEF DESCRIPTION OF THE DRAWING

FIG. 1 is a schematic view of a rechargeable lithium battery according to one embodiment of the present invention.

DETAILED DESCRIPTION OF THE INVENTION

Exemplary embodiments of the present invention will now be described. However, these embodiments are exemplary, and the present invention is not limited to these embodiments.

According to embodiments of the present invention, the negative active material for a rechargeable lithium battery includes a lithium titanium oxide having a full width at half maximum (FWHM) of 2θ ranging from about 0.08054° to about 0.10067° at a (111) plane (main peak, 2θ=18.330° as measured by XRD using a Cu Kα ray.

In some embodiments, the lithium titanium oxide may be represented by the following Chemical Formula 1.

$$Li_{4-x-y}M_yTi_{5+x-z}M'_zO_{12}$$  Chemical Formula 1

In the above Chemical Formula 1, x ranges from 0 to 1, y ranges from 0 to 1, and z ranges from 0 to 1. Also, M may be selected from La, Tb, Gd, Ce, Pr, Nd, Sm, Ba, Sr, Ca, Mg, and combinations thereof. M' may be selected from V, Cr, Nb, Fe, Ni, Co, Mn, W, Al, Ga, Cu, P, Mo, and combinations thereof. Nonlimiting examples of lithium titanium oxides satisfying Formula 1 include $Li_{3.9}Mg_{0.1}Ti_5O_{12}$, $Li_4Ti_{4.8}V_{0.2}O_{12}$, $Li_4Ti_{4.8}Nb_{0.2}O_{12}$, $Li_4Ti_{4.8}Mo_{0.2}O_{12}$ and $Li_4Ti_{4.8}P_{0.2}O_{12}$. Due to the spinel structure of the lithium titanium oxide, exchanging a small part of the lithium or titanium in the oxide with another transition metal does not change the XRD peak of the spinel structure compound.

In some exemplary embodiments, the lithium titanium oxide may be represented by the following Chemical Formula 2.

$$Li_{4-x}Ti_{5+x}O_{12} \qquad \text{Chemical Formula 2}$$

In the above Chemical Formula 2, x ranges from 0 to 1.

One nonlimiting example of a lithium titanium oxide is $Li_4Ti_5O_{12}$.

The lithium titanium oxide may have a FWHM ranging from about 0.08054° to about 0.10067°, and according to some embodiments, the lithium titanium oxide may have a FWHM ranging from about 0.08477° to about 0.09475°. In some embodiment, the lithium titanium oxide may have a FWHM ranging from about 0.0882° to about 0.0986°. When the lithium titanium oxide has a FWHM within these ranges, a rechargeable lithium battery including the lithium titanium oxide has improved initial capacity and efficiency characteristics.

In order to calculate the FWHM, the lithium titanium oxide is first measured for a XRD peak using Cu Kα ray. The XRD may be measured by a D8 Advance™ (Bruker) with the following measurement criteria: 1) a scan rate of about 0.2°/min to about 10°/min, 2) a measuring range of about 0° to about 90°, 3) a tube voltage of about 20 kV to about 90 kV, and 4) a tube current of about 20 mA to about 100 mA.

According to some embodiments, the lithium titanium oxide has a main peak of the (111) plane at about 18.330° when the XRD peak is measured according to the method. The FWHM may be obtained from a (111) plane peak at about 18.330° which is a main peak of XRD according to the Lorentzian Fit method.

According to some embodiments, the lithium titanium oxide has a crystal size ranging from about 800 Å to 1000 Å. According to other embodiments, the lithium titanium oxide has a crystal size ranging from about 850 Å to 950 Å. When the lithium titanium oxide has a crystal size within these ranges, a rechargeable lithium battery including the lithium titanium oxide is safe, capable of being charged at a high rate, and has a long cycle-life.

The crystal size of the lithium titanium oxide may be calculated by the Scherer Equation (Equation 1) after obtaining the FWHM from the XRD peak.

$$t=0.9\lambda/B \cos \theta_B \qquad \text{Equation 1}$$

In the above Equation 1, t refers to particle size, λ refers to wavelength, B refers to FWHM, and $\theta_B$ refers to peak position.

When the lithium titanium oxide has a FWHM ranging from about 0.08054° to about 0.10067°, the crystal size of the lithium titanium oxide may range from about 800 Å to about 1000 Å. In addition, when the lithium titanium oxide has a FWHM ranging from about 0.08477° to about 0.09475°, the crystal size of the lithium titanium oxide may range from about 850 Å to about 950 Å.

According to other embodiments, a method of preparing a negative active material for a rechargeable lithium battery includes heating a lithium raw material and a titanium raw material at about 800° C. to about 850° C. under an inert atmosphere to provide a lithium titanium oxide. In some embodiments, for example, the heat treatment may be carried out at a temperature of greater than about 800° C. to about 850° C.

Nonlimiting examples of lithium raw materials include $Li_2CO_3$, LiOH, LiCl, $LiNO_3$, and the like. Nonlimiting examples of titanium raw materials include $TiO_2$, $TiCl_4$ and combinations thereof.

In some embodiments, the lithium raw material and the titanium raw material may be heated at a temperature of about 810° C. to about 840° C. under an inert atmosphere. When the raw materials are heated at a temperature within this range, the crystallinity of the obtained lithium titanium oxide is improved, resulting in a rechargeable lithium battery with improved initial capacity and efficiency.

The heat treatment of the lithium and titanium raw materials may be carried out at a temperature within the above range for about 5 to about 10 hours to provide a lithium titanium oxide having a FWHM of 2θ ranging from about 0.08054° to about 0.10067° at a (111) plane as measured by X-ray diffraction (XRD) using a Cu Kα-ray. The time period for the heat treatment may be adjusted depending upon the heat treatment temperature. When the heat treatment temperature is a relatively higher temperature within the about 800° C. to about 850° C. range, the time period for the heating may be shortened.

The heat treatment may be carried out under an inert atmosphere selected from nitrogen, argon, and combinations thereof.

The crystal size of the lithium titanium oxide obtained from the heat treatment is increased to about 800 to about 1000 Å, resulting in a rechargeable lithium battery (which includes a negative active material including the lithium titanium oxide) having improved charge and discharge characteristics, such as initial capacity, efficiency, and high-rate discharge characteristics.

In addition, the obtained lithium titanium oxide may be re-heated to improve the crystallinity. When the lithium titanium oxide is re-heated to improve crystallinity, it may be carried out under the same heat treatment conditions as in the method of preparing the lithium titanium oxide from the lithium and titanium source materials. For example, the re-heating may be carried out a temperature of about 800° C. to about 850° C., or greater than about 800 to about 850° C., and for a period of time of about 5 to about 10 hours.

As described above, the crystallinity of the lithium titanium oxide affects the charge and discharge characteristics of the rechargeable lithium battery. Accordingly, when lithium titanium oxides having high crystallinity are used as the precursor, rechargeable lithium batteries including the lithium titanium oxide obtained after heat treatment show less improvement or no improvement in initial capacity, efficiency, and high-rate discharge characteristics. On the other hand, when an amorphous lithium titanium oxide is used as the precursor, rechargeable lithium batteries including lithium titanium oxides obtained after heat treatment show greater improvements in initial capacity, efficiency, and high-rate discharge characteristics.

According to further embodiments, a rechargeable lithium battery includes a negative electrode including a negative active material includes a lithium titanium oxide having a FWHM ranging from about 0.08054° to about 0.10067°. The rechargeable lithium battery further including a positive electrode including a positive active material, and a non-aqueous electrolyte. The negative electrode includes a current collector and a negative active material layer formed on the current collector. The negative active material layer includes the negative active material according to embodiments of the present invention, a binder and optionally a conductive material. The negative active material of the negative active material layer is as described above.

The binder improves the binding of the negative active material particles to each other and to the current collector. Nonlimiting examples of the binder include polyvinyl alcohol, carboxymethyl cellulose, hydroxypropyl cellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like, and combinations thereof.

Any electrically conductive material may be used as the conductive material so long as it provides conductivity and does not cause a chemical change. Nonlimiting examples of the conductive material include natural graphite, artificial graphite, and the like. The conductive material may be a mixture including a polyphenylene derivative.

Nonlimiting examples of materials for the current collector include copper foils, nickel foils, stainless steel foils, titanium foils, nickel foams, copper foams, polymer substrates coated with a conductive metal, and combinations thereof.

In the rechargeable lithium battery, the positive electrode includes a current collector and a positive active material layer on the current collector. The positive active material may include one or more lithiated intercalation compounds that reversibly intercalate and deintercalate lithium ions. The positive active material may include a composite oxide selected from oxides of cobalt, manganese, nickel, lithium, and combinations thereof. Nonlimiting examples of lithium-containing compounds include those represented by the following Formulae 3 through 27:

$$Li_aA_{1-b}X_bD_2 \ (0.90 \leq a \leq 1.8, 0 \leq b \leq 0.5) \quad \text{Formula 3}$$

$$Li_aE_{1-b}X_bO_{2-c}D_c \ (0.90 \leq a \leq 1.8, 0 \leq b \leq 0.5, 0 \leq c \leq 0.05) \quad \text{Formula 4}$$

$$LiE_{2-b}X_bO_{4-c}D_c \ (0 \leq b \leq 0.5, 0 \leq c \leq 0.05) \quad \text{Formula 5}$$

$$Li_aNi_{1-b-c}Co_bX_cD_\alpha \ (0.90 \leq a \leq 1.8, 0 \leq b \leq 0.5, 0 \leq c \leq 0.05, 0 < \alpha \leq 2) \quad \text{Formula 6}$$

$$Li_aNi_{1-b-c}Co_bX_cO_{2-\alpha}T_\alpha \ (0.90 \leq a \leq 1.8, 0 \leq b \leq 0.5, 0 \leq c \leq 0.05, 0 < \alpha < 2) \quad \text{Formula 7}$$

$$Li_aNi_{1-b-c}Co_bX_cO_{2-\alpha}T_2 \ (0.90 \leq a \leq 1.8, 0 \leq b \leq 0.5, 0 \leq c \leq 0.05, 0 < \alpha < 2) \quad \text{Formula 8}$$

$$Li_aNi_{1-b-c}Mn_bX_cD_\alpha \ (0.90 \leq a \leq 1.8, 0 \leq b \leq 0.5, 0 \leq c \leq 0.05, 0 < \alpha \leq 2) \quad \text{Formula 9}$$

$$Li_aNi_{1-b-c}Mn_bX_cO_{2-\alpha}T_\alpha \ (0.90 \leq a \leq 1.8, 0 \leq b \leq 0.5, 0 \leq c \leq 0.05, 0 < \alpha < 2) \quad \text{Formula 10}$$

$$Li_aNi_{1-b-c}Mn_bX_cO_{2-\alpha}T_2 \ (0.90 \leq a \leq 1.8, 0 \leq b \leq 0.5, 0 \leq c \leq 0.05, 0 < \alpha < 2) \quad \text{Formula 11}$$

$$Li_aNi_bE_cG_dO_2 \ (0.90 \leq a \leq 1.8, 0 \leq b \leq 0.9, 0 \leq c \leq 0.5, 0.001 \leq d \leq 0.1) \quad \text{Formula 12}$$

$$Li_aNi_bCo_cMn_dGeO_2 \ (0.90 \leq a \leq 1.8, 0 \leq b \leq 0.9, 0 \leq c \leq 0.5, 0 \leq d \leq 0.5, 0.001 \leq e \leq 0.1) \quad \text{Formula 13}$$

$$Li_aNiG_bO_2 \ (0.90 \leq a \leq 1.8, 0.001 \leq b \leq 0.1) \quad \text{Formula 14}$$

$$Li_aCoG_bO_2 \ (0.90 \leq a \leq 1.8, 0.001 \leq b \leq 0.1) \quad \text{Formula 15}$$

$$Li_aMnG_bO_2 \ (0.90 \leq a \leq 1.8, 0.001 \leq b \leq 0.1) \quad \text{Formula 16}$$

$$Li_aMn_2G_bO_4 \ (0.90 \leq a \leq 1.8, 0.001 \leq b \leq 0.1) \quad \text{Formula 17}$$

$$QO_2 \quad \text{Formula 18}$$

$$QS_2 \quad \text{Formula 19}$$

$$LiQS_2 \quad \text{Formula 20}$$

$$V_2O_5 \quad \text{Formula 21}$$

$$LiV_2O_5 \quad \text{Formula 22}$$

$$LiZO_2 \quad \text{Formula 23}$$

$$LiNiVO_4 \quad \text{Formula 24}$$

$$Li_{(3-f)}J_2(PO_4)_3 \ (0 \leq f \leq 2) \quad \text{Formula 25}$$

$$Li_{(3-f)}Fe_2(PO_4)_3 \ (0 \leq f \leq 2) \quad \text{Formula 26}$$

$$LiFePO_4 \quad \text{Formula 27}$$

In the above Formulae 3 through 27, A may be selected from Ni, Co, Mn, and combinations thereof; X may be selected from Al, Ni, Co, Mn, Cr, Fe, Mg, Sr, V, rare earth elements, and combinations thereof; D may be selected from O, F, S, P, and combinations thereof; E may be selected from Co, Mn and combinations thereof; T may be selected from F, S, P, and combinations thereof; G may be selected from Al, Cr, Mn, Fe, Mg, La, Ce, Sr, V, and combinations thereof; Q may be selected from Ti, Mo, Mn, and combinations thereof; Z may be selected from Cr, V, Fe, Sc, Y, and combinations thereof; and J may be selected from V, Cr, Mn, Co, Ni, Cu, and combinations thereof.

The compound may have a coating layer on the surface, or may be mixed with another compound having a coating layer. The coating layer may include at least one coating element compound selected from coating element oxides, coating elements hydroxides, coating element oxyhydroxides, coating element oxycarbonates, and coating element hydroxyl carbonates. The compound of the coating layer may be amorphous or crystalline. The coating element for the coating layer may include Mg, Al, Co, K, Na, Ca, Si, Ti, V, Sn, Ge, Ga, B, As, Zr, or mixtures thereof. The coating layer may be formed by any method so long as it does not adversely influence the properties of the positive active material by including these elements in the compound. For example, the method may include any coating method such as spray coating, dipping, and the like.

The positive active material layer may also include a binder and a conductive material. The binder improves binding of the positive active material particles to one another, and to the current collector. Nonlimiting examples of the binder include polyvinylalcohol, carboxymethyl cellulose, hydroxypropyl cellulose, diacetylcellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like, and combinations thereof.

The conductive material may be included to improve electrode conductivity. Any electrically conductive material may be used as a conductive material so long as it does not cause a chemical change. Nonlimiting examples of the conductive material include carbon black, acetylene black, ketjen black, carbon fibers, metal powders or metal fibers including copper, nickel, aluminum, silver, and the like, and combinations thereof. The conductive material may be a mixture including a polyphenylene derivative.

The current collector may be Al, but is not limited thereto.

The negative and positive electrodes may be fabricated by mixing the active material, a conductive material, and a binder into an active material composition and coating the composition on a current collector. The solvent may be N-methylpyrrolidone, but is not limited thereto.

In a rechargeable lithium battery according to some embodiments, a non-aqueous electrolyte includes a non-aqueous organic solvent and a lithium salt. The non-aqueous organic solvent serves as a medium for transmitting ions taking part in the electrochemical reaction of the battery. The non-aqueous organic solvent may include a carbonate-based, ester-based, ether-based, ketone-based, alcohol-based, or aprotic solvent.

Nonlimiting examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like.

Nonlimiting examples of the ester-based solvent include methyl acetate, ethyl acetate, n-propyl acetate, dimethylacetate, methylpropionate, ethylpropionate, γ-butyrolactone, decanolide, valerolactone, mevalonolactone, caprolactone, and the like.

Nonlimiting examples of the ether-based solvent include dibutyl ether, tetraglyme, diglyme, dimethoxyethane, 2-methyltetrahydrofuran, tetrahydrofuran, and the like.

Nonlimiting examples of the ketone-based solvent include cyclohexanone, and the like.

Nonlimiting examples of the alcohol-based solvent include ethyl alcohol, isopropyl alcohol, and the like.

Nonlimiting examples of the aprotic solvent include nitriles (such as R—CN, where R is a C2 to C20 linear, branched, or cyclic hydrocarbon, a double bond, an aromatic ring, or an ether bond), amides (such as dimethylformamide), dioxolanes (such as 1,3-dioxolane), sulfolanes, and the like.

A single non-aqueous organic solvent or a mixture of solvents may be used. When the organic solvent is a mixture, the mixing ratio can be adjusted in accordance with the desired battery performance.

The carbonate-based solvent may include a mixture of a cyclic carbonate and a linear carbonate. The cyclic carbonate and the linear carbonate may be mixed together in a volume ratio of about 1:1 to about 1:9, and when the mixture is used as an electrolyte, the electrolyte performance may be enhanced.

In addition, the electrolyte may further include mixtures of carbonate-based solvents and aromatic hydrocarbon-based solvents. The carbonate-based solvents and the aromatic hydrocarbon-based solvents may be mixed together in a volume ratio of about 1:1 to about 30:1.

The aromatic hydrocarbon-based organic solvent may be represented by the following Chemical Formula 28.

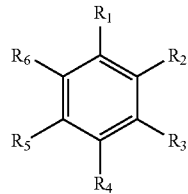

Chemical Formula 28

In the above Chemical Formula 28, each of $R_1$ to $R_6$ may be independently selected from hydrogen, halogens, C1 to C10 alkyls, C1 to C10 haloalkyls, and combinations thereof.

Nonlimiting examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The non-aqueous electrolyte may further include vinylene carbonate or an ethylene carbonate-based compound of the following Chemical Formula 29.

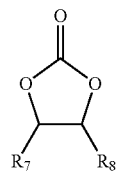

Chemical Formula 29

In the above Chemical Formula 29, each of $R_7$ and $R_8$ may be independently selected from hydrogen, halogens, cyano groups (CN), nitro groups ($NO_2$), and C1 to C5 fluoroalkyls, provided that at least one of $R_7$ and $R_8$ is a halogen, a nitro ($NO_2$), or a C1 to C5 fluoroalkyl, and $R_7$ and $R_8$ are not both hydrogen. The unsaturated aromatic hydrocarbon group may be selected from phenyl groups, and cyclo 1,3-pentadiene groups, whereas the unsaturated aliphatic hydrocarbon group may be selected from ethylene groups, propylene groups, butadiene groups, pentadiene groups, and hexatriene groups.

Nonlimiting examples of the ethylene carbonate-based compound include fluoroethylene carbonate, difluoro ethylenecarbonate, chloroethylene carbonate, dichloroethylene carbonate, bromoethylene carbonate, dibromoethylene carbonate, nitroethylene carbonate, cyanoethylene carbonate, and the like. The additive may be used in any amount suitable for improving cycle life, and may be adjusted accordingly.

The lithium salt supplies lithium ions in the battery, enables the basic operation of the rechargeable lithium battery, and improves lithium ion transport between the positive and negative electrodes. Nonlimiting examples of the lithium salt include supporting salts selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlO_4$, $LiN(C_xF_{2x+1}SO_2)(C_yF_{2y+1}SO_2$ (where x and y are natural numbers), LiCl, LiI and LiB(C$_2$O$_4$)$_2$(lithium bis(oxalato) borate; LiBOB), and combinations thereof. The lithium salt may be used at concentration of about 0.1 to about 2.0M. When the lithium salt is included at a concentration within this range, electrolyte performance and lithium ion mobility may be enhanced due to optimal electrolyte conductivity and viscosity.

The rechargeable lithium battery may further include a separator between the negative electrode and the positive electrode, as needed. Nonlimiting examples of suitable separator materials include polyethylene, polypropylene, polyvinylidene fluoride, and multi-layers thereof (such as a polyethylene/polypropylene double-layered separator, a polyethylene/polypropylene/polyethylene triple-layered separator, and a polypropylene/polyethylene/polypropylene triple-layered separator).

FIG. 1 is a schematic cross-sectional view of a rechargeable lithium battery according to some embodiments of the present invention. As shown in FIG. 1 a cylindrical rechargeable lithium battery 1 includes a positive electrode 2, a negative electrode 4, a separator 3 between the positive electrode 2 and the negative electrode 4, an electrolyte (not shown) impregnating the separator 3, a battery case 5, and a sealing member 6 sealing the battery case 5.

The following examples are presented for illustrative purposes only, and do not limit the scope of the invention.

Example 1

A Li source material of Li$_2$CO$_3$ and a Ti source material of TiO$_2$ were mixed in a mole ratio sufficient to yield Li$_4$Ti$_5$O$_{12}$ and heated at 800° C. under a N$_2$ atmosphere for 5 hours to provide a Li$_4$Ti$_5$O$_{12}$ powder.

The obtained negative active material, a polyvinylidene fluoride binder, and a carbon black conductive material were mixed in an N-methylpyrrolidone solvent at a 90:5:5 weight ratio to provide a negative active material slurry. The negative active material slurry was coated on a Cu-foil current collector to provide a negative electrode. The non-aqueous electrolyte was prepared by dissolving 1.0M LiPF$_6$ into a mixed solvent (3:7 volume ratio) of ethylene carbonate and ethylmethyl carbonate, and Li metal was used as a counter electrode to provide a coin-type half-cell.

Example 2

A coin-type half-cell was manufactured as in Example 1, except that Li$_4$Ti$_5$O$_{12}$ was prepared by heating the source materials at 800° C. for 5 hours, and then heat treating the Li$_4$Ti$_5$O$_{12}$ a second time at 800° C. for 5 hours.

Example 3

A coin-type half-cell was manufactured as in Example 1, except that Li$_4$Ti$_5$O$_{12}$ was prepared by heating for 10 hours.

Example 4

A coin-type half-cell was manufactured as in Example 1, except that Li$_4$Ti$_5$O$_{12}$ was prepared by heating the source materials at 800° C. for 5 hours, and then heat treating the Li$_4$Ti$_5$O$_{12}$ a second time at 800° C. for 10 hours.

Example 5

A coin-type half-cell was manufactured as in Example 1, except that Li$_4$Ti$_5$O$_{12}$ was prepared by heating at about 850° C. for 5 hours.

Example 6

A coin-type half-cell was manufactured as in Example 1, except that Li$_4$Ti$_5$O$_{12}$ was prepared by heating at about 850° C. for 8 hours.

Example 7

A coin-type half-cell was manufactured as in Example 1, except that Li$_4$Ti$_5$O$_{12}$ was prepared by heating at about 850° C. for 10 hours.

Comparative Example 1

A rechargeable lithium cell was manufactured as in Example 1, except that Li$_4$Ti$_5$O$_{12}$ was prepared by heating at about 750° C. for 10 hours.

Comparative Example 2

A coin-type half-cell was manufactured as in Example 1, except that Li$_4$Ti$_5$O$_{12}$ was prepared by heating at about 900° C. for 5 hours.

Comparative Example 3

A coin-type half-cell was manufactured as in Example 1, except that Li$_4$Ti$_5$O$_{12}$ was prepared by heating the source materials at 800° C. for 5 hours, and then heat treating the Li$_4$Ti$_5$O$_{12}$ a second time at 900° C. for 5 hours.

Measuring the X-ray Diffraction Angle and Calculating the FWHM

The X-ray diffraction angle (2θ) of each of the lithium titanium oxide negative active materials of Examples 1-6 and Comparative Examples 1-3 was measured. Using a Cu Kα-ray, the angle was measured at the (111) plane (main peak, 2θ=18.330°) by D8 Advance (Bruker) under the following measuring conditions: 40 kV/40 mA, 10 to 80° continuous mode scan, 0.02°/step, 0.5 second expose/step, and a scan rate of 1.2°/minute. The FWHM of each lithium titanium oxides was calculated from the measured X-ray diffraction angle. In addition, the crystal size of the negative active material was measured. Table 1 shows the X-ray diffraction angle, FWHM, and crystal size.

TABLE 1

| | Heat treatment temperature (° C.)/ time (h) | Second heat treatment temperature (° C.)/time (h) | 2θ (°) | FWHM (°) | Crystal size (Å) |
|---|---|---|---|---|---|
| Example 1 | 800/5 | — | 18.348 | 0.09835 | 819 |
| Example 2 | 800/5 | 800/5 | 18.359 | 0.09472 | 851 |
| Example 3 | 800/10 | — | 18.377 | 0.09282 | 868 |
| Example 4 | 800/5 | 800/10 | 18.368 | 0.09205 | 875 |
| Example 5 | 850/5 | — | 18.378 | 0.09143 | 881 |
| Example 6 | 850/8 | — | 18.346 | 0.08615 | 935 |
| Example 7 | 850/10 | — | 18.357 | 0.08435 | 955 |
| Comparative Example 1 | 750/10 | — | 18.375 | 0.10502 | 767 |
| Comparative Example 2 | 900/5 | — | 18.338 | 0.07915 | 1018 |
| Comparative Example 3 | 800/5 | 900/5 | 18.335 | 0.07862 | 1025 |

Measuring the Cell Efficiency

Each of the cells prepared according to Examples 1-7 and Comparative Examples 1-3 was charged and discharged at varying charge and discharge rates as shown in the following Table 2 to determine initial capacity, efficiency and high-rate discharge characteristics of each cell. The measurement results are shown in Table 2.

TABLE 2

| | | 0.1 C | 0.2 C | 0.5 C | 1 C | 2 C | 5 C | 10 C | 20 C |
|---|---|---|---|---|---|---|---|---|---|
| Ex. 1 | Discharge capacity (mAh/g) | 171.18 | 170.55 | 169.04 | 166.72 | 164.21 | 159.85 | 153.96 | 118.00 |
| | Charge & discharge efficiency (%) | 94.99 | 98.75 | 98.91 | 98.49 | 98.39 | 97.63 | 94.91 | 80.39 |
| Ex. 2 | Discharge capacity (mAh/g) | 171.47 | 170.61 | 169.74 | 168.23 | 166.34 | 162.31 | 155.80 | 120.38 |
| | Charge & discharge efficiency (%) | 95.15 | 98.76 | 98.95 | 98.56 | 98.42 | 97.84 | 95.69 | 81.76 |
| Ex. 3 | Discharge capacity (mAh/g) | 171.62 | 170.76 | 169.89 | 168.38 | 166.49 | 162.46 | 155.95 | 120.53 |
| | Charge & discharge efficiency (%) | 95.21 | 98.77 | 98.96 | 98.67 | 98.45 | 97.95 | 95.80 | 81.87 |
| Ex. 4 | Discharge capacity (mAh/g) | 171.76 | 170.89 | 170.25 | 169.78 | 167.95 | 165.32 | 162.05 | 130.27 |
| | Charge & discharge efficiency (%) | 96.03 | 98.88 | 99.05 | 98.73 | 98.51 | 98.06 | 95.95 | 82.06 |
| Ex. 5 | Discharge capacity (mAh/g) | 171.94 | 171.19 | 170.85 | 170.06 | 169.54 | 168.32 | 164.01 | 139.97 |
| | Charge & discharge efficiency (%) | 96.43 | 98.98 | 99.10 | 98.81 | 98.71 | 98.16 | 96.05 | 82.46 |
| Ex. 6 | Discharge capacity (mAh/g) | 171.54 | 170.51 | 169.71 | 168.13 | 166.05 | 161.54 | 155.67 | 119.88 |
| | Charge & discharge efficiency (%) | 95.15 | 98.76 | 98.94 | 98.59 | 98.42 | 97.81 | 95.40 | 81.21 |
| Ex. 7 | Discharge capacity (mAh/g) | 170.56 | 169.03 | 167.73 | 165.79 | 163.77 | 159.56 | 155.69 | 115.90 |
| | Charge & discharge efficiency (%) | 93.35 | 98.68 | 98.74 | 98.26 | 98.06 | 97.58 | 94.48 | 77.12 |
| Comp. Ex. 1 | Discharge capacity (mAh/g) | 168.61 | 166.38 | 164.69 | 162.49 | 161.44 | 159.07 | 149.63 | 102.56 |
| | Charge & discharge efficiency (%) | 91.19 | 96.81 | 97.83 | 97.50 | 97.49 | 97.07 | 93.63 | 69.18 |
| Comp. Ex. 2 | Discharge capacity (mAh/g) | 168.18 | 164.82 | 163.73 | 162.44 | 160.91 | 158.49 | 149.57 | 100.32 |
| | Charge & discharge efficiency (%) | 87.2 | 96.75 | 97.40 | 97.37 | 97.33 | 96.43 | 91.05 | 62.59 |
| Comp. Ex. 3 | Discharge capacity (mAh/g) | 167.83 | 164.47 | 163.38 | 162.09 | 160.56 | 158.14 | 149.22 | 99.97 |
| | Charge & discharge efficiency (%) | 86.88 | 96.43 | 97.08 | 97.05 | 97.01 | 96.11 | 90.73 | 62.27 |

In the Table, 1 C = 170 mAh/g

As shown in Table 2, the rechargeable lithium cells including the negative active materials of Examples 1 to 7 had initial discharge capacities of 170 mAh/g or greater when charged/discharged at 0.1 and 0.2 C. In contrast, the cells of Comparative Examples 1 to 3 had initial discharge capacities at those rates of less than 170 mAh/g. In addition, at the 20 C charge/discharge rate, the cells of Examples 1 to 7 showed remarkably better charge/discharge efficiency than the cells of Comparative Examples 1 to 3. Specifically, the cells of Examples 1 to 7 showed 20 C charge/discharge efficiencies of over 77%, while the cells of Comparative Examples 1 to 3 showed 20 C charge/discharge efficiencies of less than 70% (Comparative Example 1), and less than 63% (Comparative Examples 2 and 3). Therefore, the cells including negative active materials according to embodiments of the present invention exhibit significantly improved high-rate characteristics compared to the cells of the Comparative Examples. In particular, the cells including lithium titanium oxides having a FWHM of about 0.08054° to about 0.10067° showed markedly better high rate characteristics. Accordingly, the performance of rechargeable lithium cells including lithium titanium oxides having a FWHM ranging from about 0.08054° to about 0.10067° is much improved While the present invention has been described in connection with certain exemplary embodiments, it is understood by those of ordinary skill in the art that certain modifications may be made to the described embodiments without departing from the spirit and scope of the present invention, as defined by the appended claims.

What is claimed is:

1. A negative active material for a lithium rechargeable battery, the negative active material comprising a lithium titanium oxide having a full width at half maximum at a (111) plane of about 0.08054° to about 0.10067° as measured by X-ray diffraction using a Cu Kα ray, wherein the lithium titanium oxide has an average crystal size of about 800 Å to about 1000 Å, and the lithium titanium oxide comprises an oxide represented by Chemical Formula 1:

$$Li_{4-x-y}M_yTi_{5+x-z}M'_zO_{12} \qquad \text{Chemical Formula 1}$$

wherein:
M is selected from the group consisting of La, Tb, Gd, Ce, Pr, Nd, Sm, Ba, Sr, Ca, Mg, and combinations thereof;
M' is selected from the grow consisting of V, Cr, Nb, Fe, Ni, Co, Mn, W, Al, Ga, Cu, Mo, P, and combinations thereof; and
x is 0 to 1, y is 0 to 1, and z is 0 to 1, and at least one of x or y or z is greater than 0 and less than or equal to 1.

2. The negative active material according to claim 1, wherein the lithium titanium oxide has a full width at half maximum at a (111) plane of about 0.08477° to about 0.09475° as measured by X-ray diffraction using a Cu Kα ray.

3. The negative active material according to claim 1, wherein the lithium titanium oxide has a full width at half maximum at a (111) plane of about 0.0882° to about 0.0986° as measured by X-ray diffraction using a Cu Kα ray.

4. The negative active material according to claim 1, wherein the lithium titanium oxide is at least one selected from the group consisting of $Li_{3.9}Mg_{0.1}Ti_5O_{12}$, $Li_4Ti_{4.8}V_{0.2}O_{12}$, $Li_4Ti_{4.8}Nb_{0.2}O_{12}$, $Li_4Ti_{4.8}Mo_{0.2}O_2$ and $Li_4Ti_{4.8}P_{0.2}O_{12}$.

5. The negative active material according to claim 1, wherein the lithium titanium oxide comprises an oxide represented by Chemical Formula 2:

$$Li_{4-x}Ti_{5+x}O_{12} \qquad \text{Chemical Formula 2}$$

wherein x is greater than 0 and less than or equal to 1.

6. The negative active material according to claim 1, wherein the lithium titanium oxide has an average crystal size of about 850 Å to about 950 Å.

7. A rechargeable lithium battery, comprising:
a positive electrode;
a negative electrode comprising the negative active material of claim 1;
a separator; and
an electrolyte.

8. A rechargeable lithium battery, comprising:
a positive electrode;
a negative electrode comprising the negative active material of claim 2;
a separator; and
an electrolyte.

* * * * *

UNITED STATES PATENT AND TRADEMARK OFFICE
CERTIFICATE OF CORRECTION

PATENT NO. : 8,530,095 B2  
APPLICATION NO. : 12/877893  
DATED : September 10, 2013  
INVENTOR(S) : Ji-Yong Eom Page 1 of 1

It is certified that error appears in the above-identified patent and that said Letters Patent is hereby corrected as shown below:

In the Claims

Col. 13, line 5, Claim 1  Delete "grow",  
Insert --group--

Col. 13, line 21, Claim 4  Delete "$Li_4Ti_{4.8}Mo_{0.2}O_2$",  
Insert --$Li_4Ti_{4.8}Mo_{0.2}O_{12}$--

Signed and Sealed this  
Sixth Day of January, 2015

Michelle K. Lee  
*Deputy Director of the United States Patent and Trademark Office*